United States Patent [19]

Hovis et al.

[11] Patent Number: 5,675,594
[45] Date of Patent: Oct. 7, 1997

[54] COMPACT LASER APPARATUS

[75] Inventors: Floyd E. Hovis; Stephen E. Davis, both of Apopka; Bart A. Shepherd, Winter Park; Walter R. Sanders, Apopka; Ronald R. Selleck, Winter Park, all of Fla.

[73] Assignee: Litton Systems, Inc., Woodland Hills, Calif.

[21] Appl. No.: 678,475

[22] Filed: Jul. 9, 1996

Related U.S. Application Data

[62] Division of Ser. No. 414,530, Mar. 31, 1995, Pat. No. 5,608,744.

[51] Int. Cl.$^6$ .................................................. H01S 3/10
[52] U.S. Cl. .................................. 372/22; 372/97; 372/99
[58] Field of Search .................................. 372/22, 97, 99

[56] References Cited

U.S. PATENT DOCUMENTS

| | | | |
|---|---|---|---|
| 3,628,182 | 12/1971 | Rumson | 372/97 |
| 4,180,751 | 12/1979 | Ammann | 307/428 |
| 4,853,933 | 8/1989 | Blow et al. | 372/97 |
| 4,910,746 | 3/1990 | Nicholson | 372/97 |
| 4,933,943 | 6/1990 | Narhi et al. | 372/97 |
| 5,046,184 | 9/1991 | Chee et al. | 372/97 |
| 5,088,096 | 2/1992 | Pocholle et al. | 372/97 |
| 5,181,211 | 1/1993 | Burnham et al. | 372/21 |
| 5,418,810 | 5/1995 | Eguchi et al. | 372/97 |

Primary Examiner—Rodney B. Bovernick
Assistant Examiner—Robert E. Wise
Attorney, Agent, or Firm—William M. Hobby, III

[57] ABSTRACT

A laser system includes an apparatus having a primary laser resonator having a laser medium therein for producing a laser beam of a first wavelength and a second laser resonator optically connected to the primary resonator to allow a portion of the laser energy from the primary laser resonator to pass into the secondary laser resonator. An optical parametric oscillator is located intracavity of the secondary laser resonator and includes a nonlinear crystal for producing a laser beam of a second wavelength therefrom. A coherent beam output is coupled to the optical parametric oscillator for producing an output beam of predetermined wavelength of the second wavelength while blocking the output of the laser beam of the first wavelength so that a dual resonator combines a secondary laser cavity and an optical parametric oscillator to produce a predetermined output wavelength. The compact multiple resonator laser system has a substrate mirror system having four mirror surfaces thereon positioned to form two laser resonators. A multi-pass corner cube is mounted to fold the light beams between a pair of substrate mirrored surfaces while a transfer corner cube is positioned to transfer a laser beam from one resonator to the second resonator to form a very compact pair of laser resonators. One of the laser resonators is a dual resonator forming both the laser resonator and an optical parametric oscillator resonator.

10 Claims, 1 Drawing Sheet

COMPACT LASER APPARATUS

This is a divisional of application Ser. No. 08/414,530 filed Mar. 31, 1995, now U.S. Pat. No. 5,608,744.

BACKGROUND OF THE INVENTION

The present invention relates to a laser system and more particularly to a miniature pulsed laser system using coupled resonator cavities.

Increase in the use of lasers in recent years has produced a requirement for lasers of higher power that are safe for the human eye. The greater the power of the laser, the more risk there is to people who may come into contact with the laser beam when a coherent beam of light enters the eye cornea and either passes through or is absorbed by the vitreous humor. The portion of the beam that is not absorbed by the vitreous humor is focused by the eye onto the retina. Under normal conditions, the light energy is converted by the retina into chemical energy to stimulate optical sensation. Injury can result to the eye when the focused energy laser beam cannot be absorbed and causes damage to the retina. This damage does not occur when conventional sources of illumination are exposed to the eye because the light is emitted in all directions and produces a sizeable but not a focused image on the retina that can be safely absorbed. Laser beams having wavelengths in the range of 1.5 µm–2.2 µm are absorbed by the vitreous humor, thereby alleviating damage to the retina. Laser systems used as optical radar and communication transmitters in populated locations need to be operated so as to avoid eye damage.

Lasers operating in the 1.5 µm–2.2 µm wavelength have generally been of low efficiency and of larger size. Two available eyesafe lasers are based on laser emissions in erbium-doped solid state host materials pumped by pulsed gas discharge lamps or frequency conversion of a neodymium laser using stimulated raman scatter in a molecular gas, such as methane. These devices, however, have shortcomings. The erbium lasers typically have an efficiency of less than 0.1% owing to the low stimulated emission coefficient of the laser transition in erbium 3+ ion at a 1.54 µm output and to the low efficiency for optical pumping with a visible flashlamp. The erbium laser can only be operated in a pulsed mode. Stimulated Raman conversion requires a cell containing a high pressure flammable gas. This gas is excited by the neodymium pumped laser to emit stimulated radiation in the eyesafe region. Raman conversion therefore is not amenable to continuous wave operation and the Raman process deposits energy in the conversion medium causing thermal distortion so that the eyesafe Raman laser cannot be conveniently operated at high average power or repetition rate.

An article in Optics Communications, Volume 75, No. 3,4 of Mar. 1, 1990, entitled *Generation of Tunable Mid-IR (1.8–2.4 µm) Laser From Optical Parametric Oscillation* in KTP by J. T. Lin and J. T. Montgomery, describes an optical laser system in which an Nd:YAG laser is used in an optical parametric oscillator setup where the pumping beam of YAG laser pumps an optical parametric oscillator to produce an output in an eyesafe wavelength. Similarly, in the Burnham et al. U.S. Pat. No. 5,181,211, for an Eye-Safe Laser System, an Nd:YAG or Nd:YLF solid state laser is used to produce a polarized output beam which is passed through a non-linear crystal in an optical parametric oscillator to convert the wavelength of the pump laser to a wavelength that is absorbed by the human eye.

An optical parametric oscillator or OPO places a non-linear crystal within a resonant optical cavity in which mirrors transmit the pump wavelength from a laser beam through a non-linear crystal, such as potassium titanyl phosphate or KTP. The non-linear crystal can be rotated to change the output wavelength. The existence of a resonant optical cavity makes the parametric oscillator superficially similar to lasers since they also generate a coherent beam. However, since there is no stimulated emission within the parametric oscillator cavity, it does not act as a laser simply because the parametric oscillator is in a resonant optical cavity. The oscillator can be brought within the laser cavity.

The use of a short pulse (<10 ns) Nd:YAG laser to pump a non-critically phased matched KTP optical parametric oscillator in the eyesafe region results in unacceptably low conversion efficiencies, such as less than ten percent. This low efficiency apparently was due to the short pump pulses. When the OPO was placed intracavity to the pump laser, the conversion efficiency increased but the output consisted of multiple pulses rather than a clean single pulse required for many applications.

The present laser system in contrast to the prior art uses coupled laser cavities to maintain the high efficiency of an intracavity system while at the same time achieving a single pulsed output to thereby overcome the problems of an extra cavity optical parametric oscillator used in combination with an Nd:YAG laser and also overcomes the shortcomings of placing the OPO intracavity to the pump laser. The present laser system is very compact for placement in very small packages which compactness has been accomplished using a single common substrate mirror with four separately coated regions and a single corner cube to form two primary laser resonators. A second smaller corner cube is used to couple the resonators.

A typical optical parametric oscillator apparatus in which the OPO is external of the laser may be seen in U.S. Pat. No. 4,180,751 to Ammann which has a laser having a laser cavity mounted adjacent a second resonant cavity of an optical parametric oscillator with the laser being directed into the optical parametric oscillator. In the Geiger et al. U.S. Pat. No. 5,195,104, an internally stimulated optical parametric oscillator and laser places the optical parametric oscillator within the laser cavity to form a dual optical resonator containing a single optical parametric oscillator and laser crystal intracavity. A frequency modified laser which places a non-linear crystal within the laser cavity can also be seen in the Anthon et al. U.S. Pat. No. 4,884,277.

SUMMARY OF THE INVENTION

A laser system includes an apparatus having a primary laser resonator having a laser medium therein for producing a laser beam of a first wavelength and a second laser resonator optically connected to the primary resonator to allow a portion of the laser energy from the primary laser resonator to pass into the secondary laser resonator. An optical parametric oscillator is located intracavity of the secondary laser resonator and includes a non-linear crystal for producing a laser beam of a second wavelength therefrom. A coherent beam output is coupled to the optical parametric oscillator for producing an output beam of predetermined wavelength of the second wavelength while blocking the output of the laser beam of the first wavelength so that a dual resonator combines a secondary laser cavity and an optical parametric oscillator to produce a predetermined output wavelength. The compact multiple resonator laser system has a substrate mirror system having four mirror surfaces thereon positioned to form two laser resonators. A multi-pass corner cube is mounted to fold the light beams between a pair of substrate mirrored surfaces while a transfer corner cube is positioned to transfer a laser beam from one resonator to the second resonator to form a very compact pair of laser resonators. One of the laser resonators is a dual resonator forming both the laser resonator and an optical parametric oscillator resonator. A method of producing a coherent light beam of a predetermined output wavelength uses the compact laser system apparatus.

BRIEF DESCRIPTION OF THE DRAWINGS

Other objects, features, and advantages of the present invention will be apparent from the written description and the drawings in which.

DESCRIPTION OF THE PREFERRED EMBODIMENT

Figure 1:
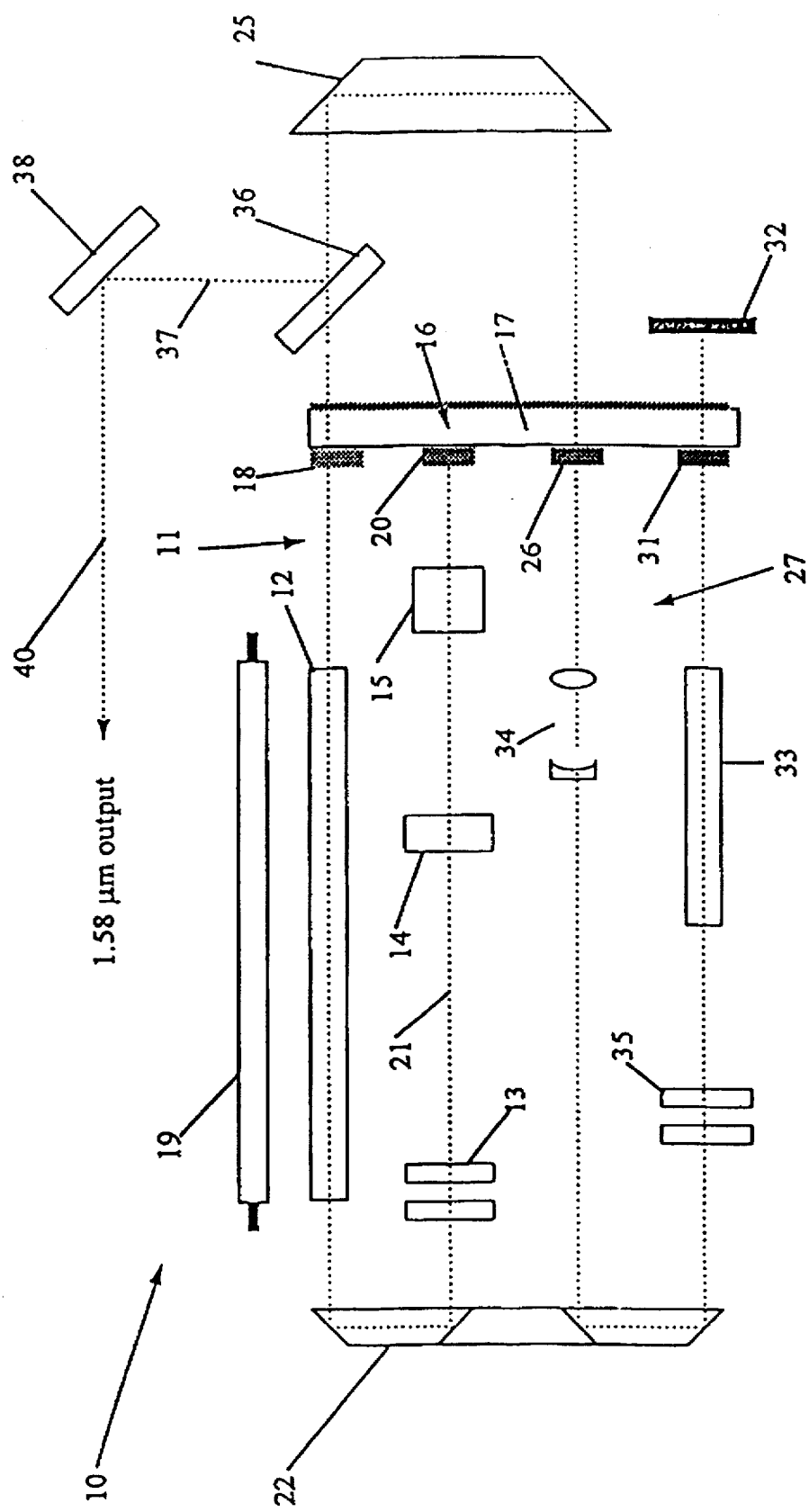
FIG. 1 is a optical schematic of a laser system in accordance with the present invention.

The present invention is for a miniature pulsed laser capable of producing 5–10 mJ at about 1.58 µm and utilizes an intracavity optical parametric oscillator in a unique coupled cavity design to achieve high efficiency without multiple pulsing in a compact mechanically and optically stable package. The compact package is less than 75 cubic centimeters and may have an eyesafe wavelength of 1.5 µm–1.6 µm capable of generating 5–10 ns pulses for use in handheld rangefinders and the like. The output of a miniature 1.064 µm Nd:YAG laser is shifted into the eyesafe region with a non-critical phased matched potassium titanyl phosphate (KTP) optical parametric oscillator (OPO). The coupled cavity design of FIG. 1 maintains the high efficiency of an intracavity device while at the same time achieving a single pulsed output. This coupled cavity laser system meets the efficiency and output requirements and allows the laser transmitter to be very compact.

Referring to the schematic of FIG. 1, the overall laser transmitter 10 includes a primary 1.06 µm resonator 11 containing a Nd:YAG rod 12 pumped by a flashlamp 19 along with a pair of steering wedges 13 and a Q-switch 14, which is illustrated as a chromium doped YAG saturable absorber. A polarizing element 15 may be a brewster plate. These elements are mounted inside a resonator formed by the 1.06 µm decoupling region of a common substrate mirror 16 having the substrate 17 having a 30% reflectance of 1.06 µm mirror 18 mounted on the substrate 16 and a 100% 1.06 µm reflecting mirror 20 mounted on the substrate to form a resonance cavity between the mirrored surfaces 20 and 18. The laser rod 12 is in the beam path, illustrated as 21, which is folded by the multi-pass corner cube 22 providing folding surfaces to fold the beam 21. Thus, the laser rod 12 is pumped by an optical flashlamp (not shown) to produce the lasing action within the resonant cavity between the mirrored surfaces 18 and 20. The beam passes through the 30% reflecting surface 18 where the beam is folded by the transfer corner cube 25 and passes back through the substrate 16 and through a mirrored surface portion 26 which has a zero reflectance for the 1.06 µm.

The 1.06 µm laser beam passes into a secondary 1.06 µm resonator 27 where it is folded by the multi-pass corner cube 22 back to a fourth mirrored surface area 31 on the common substrate 16. Mirror 31 has an 80% reflectance of 1.06 µm wavelength, and allows 20% to pass therethrough into the 1.06 µm dump 32. Since the mirror 31 is reflecting 80% of the 1.06 µm, a portion of the energy is passed back through the secondary resonant cavity 27 and back through the mirrored surface 26 through the corner cube 25 where a portion of the energy passes through the mirrored surface 18 while a portion of it is reflected back into the secondary cavity.

The secondary cavity 27 forms a dual optical resonator which is both a secondary laser resonator and an optical parametric oscillator resonator. The optical parametric oscillator is formed by having the potassium titanyl phosphate (or KTP) crystal 33 within the beam path within the cavity 27. This OPO resonator is a 1.58 µm resonator containing the down scope 34 along with a pair of steering wedges 35 and a KTP crystal 33. The resonator is formed by the 1.58 µm outcoupling region of the common substrate mirror 26 which is 50% reflective of the 1.58 µm beam but transparent to the 1.06 µm beam. The 1.58 µm mirror 31 reflects 100% of the energy while reflecting only 80% of the 1.06 µm beam. Similarly, the 1.58 µm resonator also uses the multi-pass corner cube 22.

The 1.58 µm output from the dual resonant cavity 27 passes through the mirrored portion 26 and is coupled out of the system as the energy passes through the transfer corner cube 25 and impinges on the dichroic beam splitter 36. The dichroic beam splitter reflects the entire 1.58 µm energy along the path 37 where it impinges against a second dichroic beam splitter 38 to produce a 1.58 µm output 40. Thus, the output from the 1.58 µm resonator is produced from the output of the laser while the 1.06 µm energy passes back through the dichroic beam splitter 36 and a portion of which passes through the mirrored surface 18 while a portion is reflected back through the beam splitter 36, transfer corner cube and back into the secondary laser cavity 27.

The operation of the laser resonator is as follows: Firing of the flashlamp causes the gain to begin to buildup in the Nd:YAG rod 12. Initially, the single pass loss of the saturable absorber 14 is high and this loss combined with the out coupling mirror 18 losses prevents the buildup of laser oscillation. Eventually, the round trip gain exceeds the round trip losses and the 1.06 µm field begins to grow in both primary 1.06 µm cavity 11 and the secondary 1.06 µm cavity 27. The feedback from the mirror in the secondary 1.06 µm resonator 27 lowers the threshold at which the 1.06 µm oscillation will begin. As the 1.06 µm field grows, the absorption loss due to the saturable absorber 14 begins to saturate allowing yet more growth of the 1.06 µm field. This cycle continues until the saturable absorber transmission has increased significantly and a Q-switch 1.06 µm pulse has begun to develop. As the 1.06 µm field in the secondary resonator 27 grows, it eventually reaches a level at reach it begins to be converted by the KTP crystal 33 into two longer wavelengths. The crystal 33 angle determines what two wavelengths are generated by the crystal 33 and the angle has been chosen in the present crystal, such as to produce wavelengths of 1.58 µm and 3.26 µm. In a pure intracavity optical parametric oscillator, the nonlinear conversion of the 1.06 µm field to the longer wavelengths causes the 1.06 µm field to be depleted and to cease oscillation before the stored energy in the Nd:YAG rod has been fully extracted. This residual stored energy can result in one or more secondary 1.06 µm and 1.58 µm pulses. By placing the OPO in a secondary 1.06 µm cavity that does not contain the 1.06 µm gain medium, the non-linear conversion process does not directly interact with the 1.06 µm field that extracts the stored energy in the Nd:YAG rod 12. This allows the 1.06 µm oscillation to continue in the primary cavityfield in the sec 1.06 µm field in the secondary cavity 27 begins to be depleted. The net result is a suppression of premature termination of the 1.06 µm oscillation. That leads to a significantly reduced tendency for secondary pulsing and increased conversion of 1.06 μm pump to eyesafe 1.58 μm output.

The key to the compactness of the laser 10 is the use of a dual path corner cube 22 along with a transfer corner cube 25 and a single common substrate mirror 16 having the four mirrored surfaces thereon to form all of the optical resonators, as shown in FIG. 1. In actual practices, it has found that the present laser transmitter can be placed in a total volume of less than 75 cubic centimeters to produce an output in excess of 6 mJ of output at 1.58 μm. Thus, the output energy of greater than 5 mJ per pulse at 1.58 μm is achieved with the efficiency of intracavity OPO without the multiple pulsing problem experienced with an intracavity laser OPO. In addition, the use of a common substrate mirror 16 and the multi-pass corner cube 22 along with the transfer corner cube 25 to form the coupled resonator system results in an overall miniaturization of a laser transmitter to a very small volume of space and also allows for a high degree of alignment stability over extreme temperature and vibration environments. The illustrated laser transmitter of FIG. 1, however, should not be considered as limited to the schematic shown but should be considered illustrative rather than restrictive.

I claim:

1. A compact multiple resonator laser system comprising:

a substrate mirror having at least three mirror surfaces thereon positioned to form reflection surfaces for at least two laser resonators, said at least mirror surfaces having different degrees of reflectance for predetermined wavelengths;

a multi-pass corner cube positioned to fold the laser beams for at least the two laser resonators to thereby form at least first and second laser resonators with said mirror substrate;

a laser medium positioned in said first laser resonator; and a transfer corner cube positioned to transfer a laser beam from said first laser resonator to said second laser resonator thereby producing a compact multiple resonator laser system.

2. A compact multiple resonator laser system in accordance with claim 1 having an optical parametric oscillator located intracavity of said second laser resonator to produce a beam of predetermined wavelength.

3. A compact multiple resonator laser system in accordance with claim 2 having a beam output from said optical parametric oscillator, said beam output having at least one dichroic beam splitter.

4. A compact multiple resonator laser system in accordance with claim 2 in which said optical parametric oscillator has a non-linear crystal mounted therein.

5. A compact multiple resonator laser system in accordance with claim 4 in which said optical parametric oscillator has a downscope intracavity thereof.

6. A compact multiple resonator laser system in accordance with claim 1 in which said first laser resonator includes a saturable absorber Q-switch.

7. A compact multiple resonator laser system in accordance with claim 1 in which first laser resonator has a chromium doped YAG saturable absorber.

8. A compact multiple resonator laser system in accordance with claim 1 in which said first laser resonator has a polarizing element therein.

9. A compact multiple resonator laser system in accordance with claim 1 including a laser beam dump positioned adjacent said secondary laser resonator for absorbing the output of said secondary laser resonator.

10. A compact multiple resonator laser system in accordance with claim 1 in which said laser medium in said first resonator is Nd:YAG rod.

* * * * *